US011028753B2

(12) United States Patent
Garimella et al.

(10) Patent No.: US 11,028,753 B2
(45) Date of Patent: Jun. 8, 2021

(54) SYSTEM AND METHOD FOR DETERMINING ENGINE OUT NOX BASED ON IN-CYLINDER CONTENTS

(71) Applicant: Cummins, Inc., Columbus, IN (US)

(72) Inventors: Phanindra V. Garimella, Bloomington, IN (US); Aniket Gupta, Columbus, IN (US); Ming-Feng Hsieh, Nashville, IN (US); Paul V. Moonjelly, Columbus, IN (US); Anant Puri, Columbus, IN (US); Gokul Vishwanathan, Olney, MD (US)

(73) Assignee: Cummins, Inc., Columbus, IN (US)

( * ) Notice: Subject to any disclaimer, the term of this patent is extended or adjusted under 35 U.S.C. 154(b) by 396 days.

(21) Appl. No.: 15/549,236

(22) PCT Filed: Feb. 9, 2016

(86) PCT No.: PCT/US2016/017101
§ 371 (c)(1),
(2) Date: Aug. 7, 2017

(87) PCT Pub. No.: WO2016/130517
PCT Pub. Date: Aug. 18, 2016

(65) Prior Publication Data
US 2018/0038255 A1 Feb. 8, 2018

Related U.S. Application Data

(60) Provisional application No. 62/114,399, filed on Feb. 10, 2015.

(51) Int. Cl.
*F01N 3/20* (2006.01)
*F02D 41/00* (2006.01)
(Continued)

(52) U.S. Cl.
CPC ............. *F01N 3/208* (2013.01); *F02D 35/02* (2013.01); *F02D 35/026* (2013.01);
(Continued)

(58) Field of Classification Search
CPC .. F01N 3/208; F02D 41/1461; F02D 41/1454; F02D 41/0062; F02D 2200/1002; F02D 2200/101; F02D 2200/021
See application file for complete search history.

(56) References Cited

U.S. PATENT DOCUMENTS

| 4,130,095 A | 12/1978 | Bowler et al. |
| 5,150,682 A * | 9/1992 | Magnet ................ F02B 77/08 |
| | | 123/25 J |

(Continued)

FOREIGN PATENT DOCUMENTS

CN 102191979 9/2011

OTHER PUBLICATIONS

International Search Report and Written Opinion issued for PCT/US2016/017101, dated Apr. 11, 2016, 11 pages.
(Continued)

*Primary Examiner* — Anthony Ayala Delgado
(74) *Attorney, Agent, or Firm* — Foley & Lardner LLP

(57) ABSTRACT

An apparatus includes an engine module, an in-cylinder content module, and an engine out NOx module. The engine module is structured to interpret engine in-cylinder data regarding an operating condition within a cylinder of an engine, wherein the engine in-cylinder data includes an engine torque, an engine speed, a rail pressure, and a start-of-injection. The in-cylinder content module is structured to interpret at least one additional in-cylinder data point regarding the operating condition within the cylinder of the engine. The engine out NOx module is structured to determine an engine out NOx amount responsive to the
(Continued)

engine in-cylinder data and the at least one additional in-cylinder data point.

24 Claims, 11 Drawing Sheets

(51) Int. Cl.
| | | |
|---|---|---|
| *F02D 41/14* | (2006.01) | |
| *F02D 35/02* | (2006.01) | |
| *F01N 3/10* | (2006.01) | |
| *F01N 3/035* | (2006.01) | |
| *F02D 41/22* | (2006.01) | |
| *F01N 13/00* | (2010.01) | |

(52) U.S. Cl.
CPC ..... *F02D 41/0062* (2013.01); *F02D 41/1454* (2013.01); *F02D 41/1458* (2013.01); *F02D 41/1461* (2013.01); *F02D 41/1462* (2013.01); *F01N 3/035* (2013.01); *F01N 3/106* (2013.01); *F01N 3/2066* (2013.01); *F01N 13/009* (2014.06); *F01N 2370/04* (2013.01); *F01N 2560/021* (2013.01); *F01N 2560/06* (2013.01); *F01N 2560/14* (2013.01); *F01N 2570/18* (2013.01); *F01N 2610/02* (2013.01); *F01N 2610/03* (2013.01); *F01N 2900/0416* (2013.01); *F01N 2900/08* (2013.01); *F01N 2900/1402* (2013.01); *F01N 2900/1404* (2013.01); *F02D 41/0072* (2013.01); *F02D 2041/1472* (2013.01); *F02D 2041/228* (2013.01); *F02D 2200/021* (2013.01); *F02D 2200/0418* (2013.01); *F02D 2200/101* (2013.01); *F02D 2200/1002* (2013.01); *F02D 2250/36* (2013.01); *Y02T 10/12* (2013.01); *Y02T 10/40* (2013.01)

(56) References Cited

U.S. PATENT DOCUMENTS

| | | | |
|---|---|---|---|
| 5,703,777 A * | 12/1997 | Buchhop | G01M 15/102 123/1 A |
| 7,676,318 B2 | 3/2010 | Allain | |
| 8,301,356 B2 | 10/2012 | Wang et al. | |
| 8,453,431 B2 | 6/2013 | Wang et al. | |
| 8,700,291 B2 | 4/2014 | Herrmann | |
| 2004/0073381 A1* | 4/2004 | Ali | F02D 41/1462 702/31 |
| 2005/0228573 A1 | 10/2005 | Gangopadhyay | |
| 2006/0086080 A1* | 4/2006 | Katogi | F01N 11/00 60/278 |
| 2008/0149081 A1* | 6/2008 | Allain | F02D 41/021 123/568.21 |
| 2009/0071150 A1* | 3/2009 | Joergl | F02M 26/06 60/605.2 |
| 2009/0188475 A1* | 7/2009 | Ueda | F02M 26/05 123/568.12 |
| 2009/0301066 A1* | 12/2009 | Sindano | F01N 3/208 60/286 |
| 2010/0024787 A1* | 2/2010 | Chi | F02D 41/0072 123/568.11 |
| 2011/0214650 A1* | 9/2011 | Wang | F02D 41/00 123/703 |
| 2012/0085081 A1* | 4/2012 | Mohammed | F01N 3/206 60/274 |
| 2013/0074494 A1 | 3/2013 | Chi et al. | |
| 2014/0260201 A1 | 9/2014 | Hall | |
| 2014/0318216 A1* | 10/2014 | Singh | G01M 15/102 73/23.31 |
| 2016/0103110 A1* | 4/2016 | Lack | F02D 41/14 702/24 |
| 2016/0123258 A1* | 5/2016 | Lack | F02D 41/0235 60/274 |

OTHER PUBLICATIONS

English Translation of Office Action Received for Chinese Application No. 201680009013.2, dated Nov. 1, 2019, 7 pages.

* cited by examiner

SYSTEM AND METHOD FOR DETERMINING ENGINE OUT NOX BASED ON IN-CYLINDER CONTENTS

CROSS-REFERENCE TO RELATED APPLICATIONS

The present application is a U.S. national stage application claiming the benefit of priority to International Application No. PCT/US2016/017101, filed on Feb. 9, 2016, which claims the benefit of priority to U.S. Provisional Patent Application No. 62/114,399, filed Feb. 10, 2015. Both applications are incorporated herein by reference in their entirety.

TECHNICAL FIELD

The present disclosure relates to systems and methods for determining an engine out nitrogen oxide (NOx) amount. More particularly, the present disclosure relates to systems and methods for determining an engine out NOx amount from one or more in-cylinder data points/values.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides, hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable. In fact, some regulations require on-board diagnostic (OBD) monitoring or testing of many of the components of the exhaust aftertreatment system. When equipped on vehicles, most monitoring and testing of aftertreatment system components are performed during on-road operation of the vehicle (e.g., while the vehicle is being driven on the road). Although such monitoring and testing may be convenient, the efficacy of the monitoring and testing may be limited because the engine cannot be operated outside of a given on-road calibrated operating range. Additionally, because on-road operating demands typically have priority over diagnostic and performance recovery procedures, the order, timing, and control of such procedures may be less than ideal. As a result, the detection and correction of various failure modes in the exhaust aftertreatment system may be limited.

SUMMARY

One embodiment relates to an apparatus. The apparatus includes an engine module, an in-cylinder content module, and an engine out NOx module. The engine module is structured to interpret engine in-cylinder data regarding an operating condition within a cylinder of an engine, wherein the engine in-cylinder data includes an engine torque, an engine speed, a rail pressure, and a start-of-injection. The in-cylinder content module is structured to interpret at least one additional in-cylinder data point regarding the operating condition within the cylinder of the engine. The engine out NOx module is structured to determine an engine out NOx amount responsive to the engine in-cylinder data and the at least one additional in-cylinder data point. Advantageously, by utilizing in-cylinder data to determine an engine out NOx amount, a relatively more accurate determination is achieved which may provide for enhanced control over one or more components in an engine-exhaust aftertreatment system.

Another embodiment relates to a system. The system includes an exhaust aftertreatment system in fluid communication with an engine, and a controller communicably and operatively coupled to the exhaust aftertreatment system. According to one embodiment, the controller is structured to: interpret engine in-cylinder data regarding an operating condition within a cylinder of the engine, wherein the engine in-cylinder data includes an engine torque and an engine speed; interpret at least one additional in-cylinder data point regarding the operating condition within the cylinder of the engine; and determine an engine out NOx amount responsive to the engine in-cylinder data and the at least one additional in-cylinder data point.

Yet another embodiment relates to a method. The method includes identifying, by a controller, an in-cylinder data point indicative of one or more conditions within a cylinder of an engine; selecting, by the controller, one or more of the in-cylinder data points; responsive to selecting the one or more in-cylinder data points, formulating, by the controller, a steady state approximation indicative of operating conditions of the engine in a steady state condition; and determining, by the controller, an engine out NOx amount at a transient engine cycle based on the steady state approximation.

Still another embodiment relates to an apparatus. The apparatus includes means for interpreting engine in-cylinder data regarding an operating condition within a cylinder of an engine, the engine in-cylinder data including an engine torque and an engine speed; means for interpreting at least one additional in-cylinder data point regarding the operating condition within the cylinder of the engine; and means for determining an engine out NOx amount responsive to the engine in-cylinder data and the at least one additional in-cylinder data point.

These and other features, together with the organization and manner of operation thereof, will become apparent from the following detailed description when taken in conjunction with the accompanying drawings.

DETAILED DESCRIPTION

Figure 1:
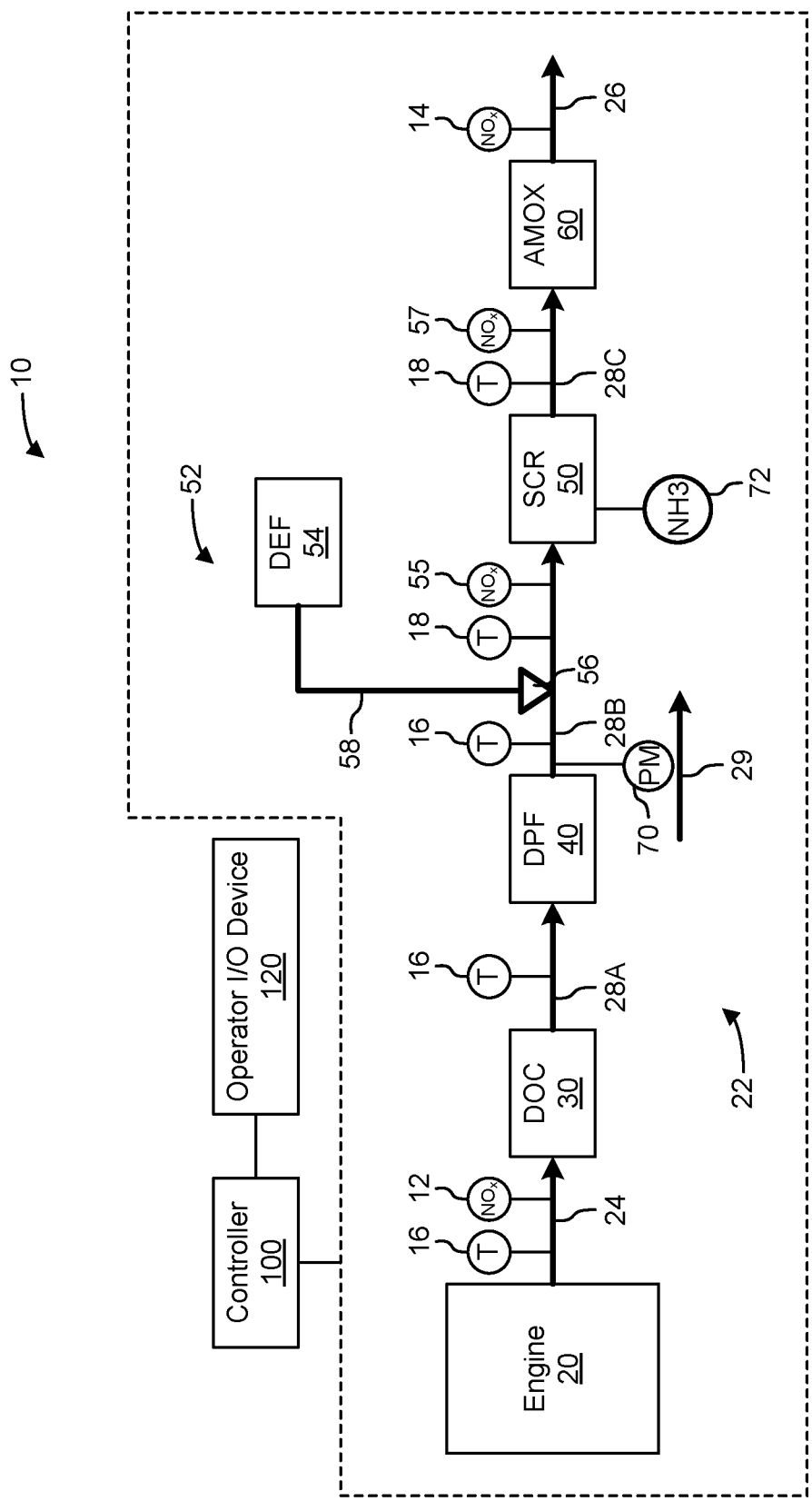
FIG. 1 is a schematic diagram of an exhaust aftertreatment system with a controller, according to an example embodiment.

Following below is a detailed description of various concepts related to, and implementations of, methods, apparatuses, and systems for facilitating the determination of an engine out NOx amount from an internal combustion engine. The various concepts introduced above and discussed in greater detail below may be implemented in any of numerous ways, as the described concepts are not limited to any particular manner of implementation. Examples of specific implementations and applications are provided primarily for illustrative purposes.

Referring to the Figures generally, the various embodiments disclosed herein relate to a system and method of facilitating the determination of an engine out NOx amount from an internal combustion engine. According to the present disclosure, a controller identifies a plurality of in-cylinder data points, selects one or more in-cylinder data points for use in an engine out NOx amount model (e.g., formula, algorithm, process, etc.), and determines an engine out NOx amount. Conventional systems that estimate or determine an engine out NOx amount utilize at least one of intake manifold cylinder data (e.g., intake manifold pressure data, intake manifold temperature data, intake manifold oxygen fraction data, etc.) and exhaust manifold cylinder data (e.g., exhaust manifold pressure data, exhaust manifold temperature data, exhaust manifold oxygen fraction data, etc.). Generally speaking, these conventional systems fail to take into consideration combustion dynamics occurring within the cylinders of an engine. As a result, these systems tend to be inaccurate at determining an engine out NOx amount during at least one of a steady state and a transient engine cycle (e.g., moments of high speed or torque excursions). As described more fully herein, Applicants have developed a system, method, and apparatus of facilitating a relatively accurate determination of an engine out NOx amount at both steady state and transient engine cycles by utilizing one or more pieces of in-cylinder data (data indicative of the conditions occurring within the cylinder of an engine). Moreover and beneficially, the system, method, and apparatus of the present disclosure facilitates and provides engine out NOx determinations that may be widely applicable with a variety of engine types due to the use of in-cylinder data. In this regard, such determinations may be independent of engine architecture (e.g., six-cylinder, four-cylinder, turbocharger present or not present, etc.). According to one embodiment, the in-cylinder data includes in-cylinder oxygen fraction data. According to other embodiments, the in-cylinder data includes trapped air mass data, in-cylinder exhaust gas recirculation (EGR) data, a temperature at an intake valve closing ($T_{ivc}$) data, and in-cylinder oxygen-to-fuel ratio data. This in-cylinder data list provided above is not meant to be exhaustive, such that various combinations of particular in-cylinder data and other non-mentioned in-cylinder data points may be used by the controller to determine an engine out NOx amount.

Through experimentation, Applicants have discovered that utilizing in-cylinder data facilitates a relatively more accurate determination of engine out NOx relative to conventional systems and methods. Technically and advantageously, a result of the present disclosure is an increased level of control over one or more components in an exhaust aftertreatment system. For example, when engine out NOx is inaccurately determined, a doser that injects diesel exhaust fluid into the exhaust stream may inject an incorrect amount of diesel exhaust fluid. This incorrect injection amount may cause OBD fault triggers, poor diagnostics from one or more sensors included in the aftertreatment system, potentially unnecessary service on the aftertreatment system, and (among others) a wasting of diesel exhaust fluid. Accordingly and advantageously, the system and method of the present disclosure may reduce costs on unnecessary servicing (e.g., diesel exhaust fluid refills, etc.), facilitate relatively accurate engine out NOx determinations in both steady state and transient engine cycles, increase engine out NOx determination dynamics by reducing model complexity to focus on the in-cylinder data described herein, and facilitate an increased level of control over various aftertreatment components (e.g., a doser, etc.). These and other features of the present disclosure are more fully explained herein.

Referring now to FIG. 1, an engine exhaust aftertreatment system with a controller is shown, according to an example embodiment. It should be understood that the schematic depicted in FIG. 1 is but one implementation of an engine exhaust aftertreatment system. Many different configurations may be implemented that utilize the systems and methods described herein. In some embodiments, the present disclosure may be used with internal combustions in general (e.g., both including and excluding exhaust aftertreatment systems). Accordingly, while the system and method described herein are primarily directed to engine exhaust aftertreatment systems, it should be understood that the system and method of the present disclosure may be used in a variety configurations that include and exclude aftertreatment systems, such that the embodiment depicted in FIG. 1 is not meant to be limiting.

As shown in FIG. 1, the engine system 10 includes an internal combustion engine 20 and an exhaust aftertreatment system 22 in exhaust gas-receiving communication with the engine 20. According to one embodiment, the engine 20 is structured as a compression-ignition internal combustion engine that utilizes diesel fuel. However, in various alternate embodiments, the engine 20 may be structured as any other type of engine (e.g., spark-ignition) that utilizes any type of fuel (e.g., gasoline). Within the internal combustion engine 20, air from the atmosphere is combined with fuel, and combusted, to power the engine. Combustion of the fuel and air in the compression chambers (e.g., cylinders) of the engine 20 produces exhaust gas that is operatively vented to an exhaust manifold and to the exhaust aftertreatment system 22.

In the example depicted, the exhaust aftertreatment system 22 includes a diesel particular filter (DPF) 40, a diesel oxidation catalyst (DOC) 30, a selective catalytic reduction (SCR) system 52 with a SCR catalyst 50, and an ammonia oxidation (AMOx) catalyst 60. The SCR system 52 further includes a reductant delivery system that has a diesel exhaust fluid (DEF) source 54 that supplies DEF to a DEF doser 56 via a DEF line 58. In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOX catalyst 60. However, in alternative embodiments, other arrangements of the components of the exhaust aftertreatment system 22 are also possible.

The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In addition to treating the hydrocarbon and CO concentrations in the exhaust gas, the DOC 30 may also be used in the controlled regeneration of the DPF 40, SCR catalyst 50, and AMOx catalyst 60. This may be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to reduce particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. Additionally, the DPF 40 may be configured to oxidize NO to form $NO_2$ independent of the DOC 30.

As briefly described above, the SCR system 52 may include a reductant delivery system with a reductant (e.g., DEF) source 54, a pump and a delivery mechanism or doser 56. The reductant source 54 can be a container or tank capable of retaining a reductant, such as, for example, ammonia ($NH_3$), DEF (e.g., urea), or diesel oil. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts configured to react with ammonia to produce mainly nitrogen. As briefly described above, the AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst may be integrated with the SCR catalyst, e.g., the AMOx catalyst and the SCR catalyst can be located within the same housing. According to the present disclosure, the SCR catalyst and AMOx catalyst are positioned serially, with the SCR catalyst preceding the AMOx catalyst. In various other embodiments, the AMOx catalyst is not included in the exhaust aftertreatment system 22. In these embodiments, the NOx sensor 14 may be excluded from the exhaust aftertreatment system 22 as well.

As shown, a plurality of sensors are included in the aftertreatment system 22. The number, placement, and type of sensors included in the system 22 is shown for example purposes only. In other configurations, the number, placement, and type of sensors may differ. As shown, the system 22 includes a $NH_3$ sensor 72, NOx sensors 12, 14, 55, 57, temperature sensors 16, 18, and a particulate matter (PM) sensor 70. The $NH_3$ sensor 72 is structured to acquire data indicative of an $NH_3$ amount in the SCR 50. The temperature sensors 16, 18 are structured to acquire data indicative of a temperature at their locations. The NOx sensors 12, 14, 55, and 57 are structured to acquire data indicative of a NOx amount at each location that the NOx sensor is located. The PM sensor 70 is structured to monitor particulate matter flowing through the exhaust aftertreatment system 22. The controller 100 is communicably coupled to each of the sensors in the aftertreatment system 22. Accordingly, the controller 100 is structured to receive data from one more of the sensors. The received data may be used by the controller 100 to control one more components in the aftertreatment system and/or for monitoring and diagnostic purposes.

While the aftertreatment system 22 is shown to include a NOx sensor 12 positioned after the engine 20, due to the sampling rate and sensitivity of the sensor, the data provided by the NOx sensor 12 may be fairly inaccurate during transient cycles and, in turn, not be representative of a true engine out NOx amount. For example, a torque excursion by the engine 20 may be momentary (e.g., two seconds) while the sampling rate of the sensor is longer than the excursion, such that the data from the excursion is missed and not considered. Furthermore, the NOx sensor 12 is positioned at a distance away from the engine 20. Accordingly, the NOx sensor 12 may not reflect the true engine out NOx amount from the engine 20. Due to these shortcomings, control over the doser 56 (among other aftertreatment system components) may be inaccurate. As mentioned above, this lack of control may lead to warranty claims, unintended OBD fault triggers, and poor diagnostics for the aftertreatment system 22. Therefore, the system and method of the present disclosure are structured to facilitate a relatively more accurate engine out NOx determination process.

As mentioned above, although the exhaust aftertreatment system 22 shown includes one of a DOC 30, DPF 40, SCR catalyst 50, and AMOx catalyst 60 positioned in specific locations relative to each other along the exhaust flow path, in other embodiments, the exhaust aftertreatment system may include more than one of any of the various catalysts positioned in any of various positions relative to each other along the exhaust flow path as desired. Further, although the DOC 30 and AMOX catalyst 60 are non-selective catalysts, in some embodiments, the DOC and AMOX catalyst can be selective catalysts.

FIG. 1 is also shown to include an operator input/output (I/O) device 120. The operator I/O device 120 may be communicably coupled to the controller 100, such that information may be exchanged between the controller 100 and the I/O device 120, wherein the information may relate to one or more components of FIG. 1 or determinations (described below) of the controller 100. The operator I/O device 120 enables an operator of the engine system 10 to communicate with the controller 100 and one or more components of the engine system 10 of FIG. 1. For example, the operator input/output device 120 may include, but is not limited to, an interactive display, a touchscreen device, one or more buttons and switches, voice command receivers, etc. In various alternate embodiments, the controller 100 and components described herein may be implemented with non-vehicular applications (e.g., a power generator). Accordingly, the I/O device may be specific to those applications. For example, in those instances, the I/O device may include a laptop computer, a tablet computer, a desktop computer, a phone, a watch, a personal digital assistant, etc.

The controller 100 is structured to control the operation of the engine system 10 and associated sub-systems, such as the internal combustion engine 20 and the exhaust gas aftertreatment system 22 (and various components of each system such as the doser 56). According to one embodiment, the components of FIG. 1 are embodied in a vehicle. In various alternate embodiments, as described above, the controller 100 may be used with any engine system and/or any engine-exhaust aftertreatment system (e.g., a power generator). The vehicle may include an on-road or an off-road vehicle including, but not limited to, line-haul trucks, mid-range trucks (e.g., pick-up trucks), tanks, airplanes, and any other type of vehicle that utilizes an exhaust aftertreatment system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 100 is communicably coupled to the systems and components of FIG. 1, the controller 100 is structured to receive data from one or more of the components shown in FIG. 1. The structure and function of the controller 100 is further described in regard to FIG. 3.

Figure 2:
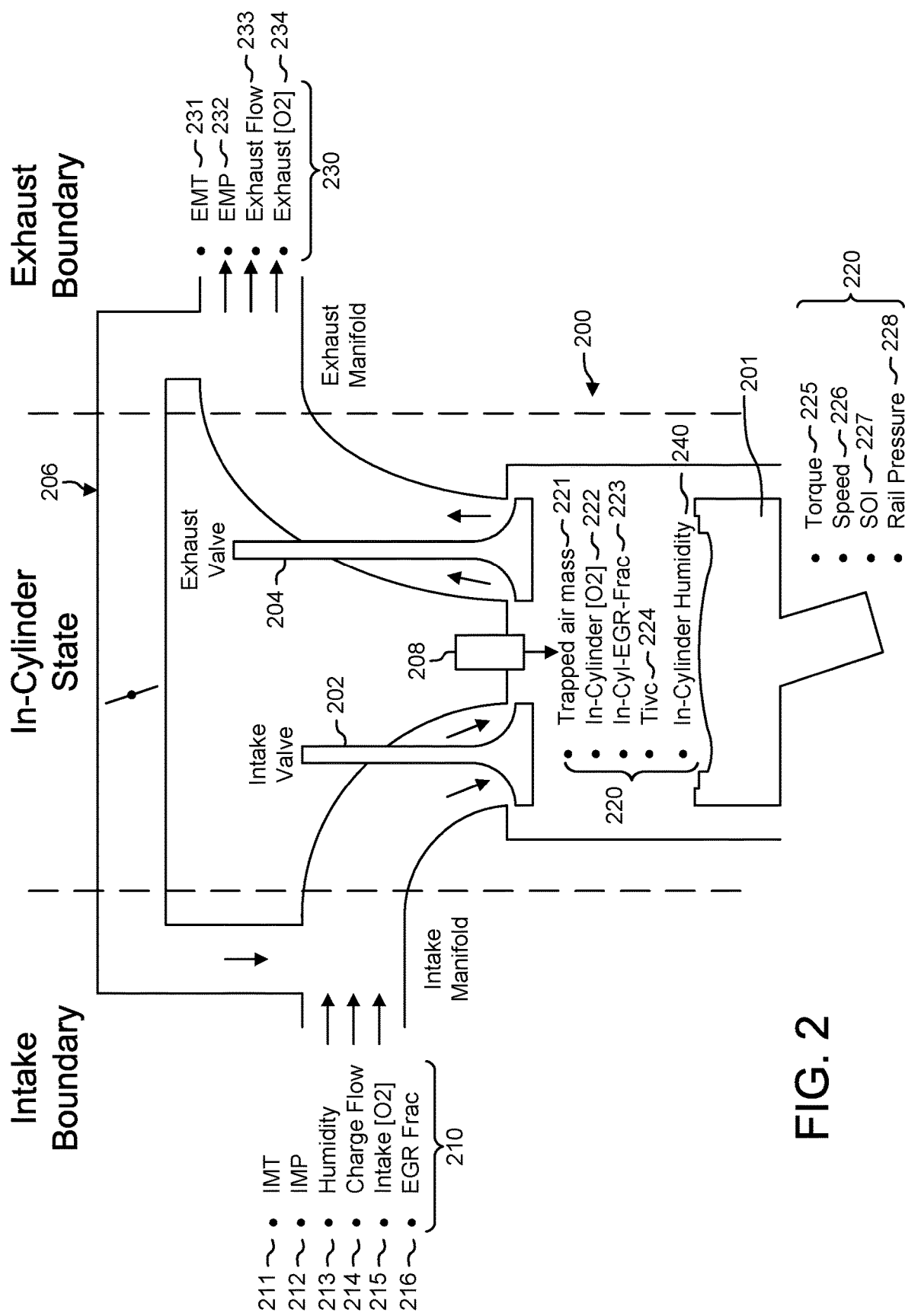
FIG. 2 is a schematic diagram of a cylinder for an engine and the contents thereof, according to an example embodiment.

Referring now to FIG. 2, a cross-sectional view of a cylinder for an engine is shown, according to an example embodiment. As shown, the cylinder 200 is a part of the engine 20 of FIG. 1. Accordingly, the cylinder 200 facilitates compression-ignition for a fuel (e.g., diesel). As shown, the cylinder 200 receives a piston 201 that is structured to compress a fuel (from fuel injector 208) and air (from the intake manifold) to cause combustion. The cylinder 200 also includes an intake valve 202 and an exhaust valve 204. The intake valve 202 is coupled to an intake manifold and EGR piping 206 (e.g., tubing, conduit, etc.). The EGR piping 206 is communicably coupled to both the exhaust manifold and the intake manifold. The EGR piping 206 is shown to include a valve the selectively controls an amount of exhaust gas from the exhaust manifold to the intake manifold. Accordingly, in the example shown, the cylinder 200 receives a charge (e.g., a quantity of air) plus an amount of EGR from the piping 206. The air charge, EGR, and fuel from injector 208 are used by the piston 201-cylinder 200 to cause combustion which generates power from the engine 20.

NOx (nitrogen oxides including NO and $NO_2$) is a byproduct of combustion. The emission of NOx from an engine may be undesirable due to NOx (along with other compounds) having the ability to form smog, acid rain, and other types of pollution. The formation of NOx may be described in regard equations (1)-(3):

$$O + N_2 \rightarrow NO + N \quad (1)$$

$$N + O_2 \rightarrow O + NO \quad (2)$$

$$N + OH \rightarrow H + NO \quad (3)$$

Equations (1)-(3) are reversible and refer to the Zeldovich Mechanism that describes how NOx may be formed.

Referring still to FIG. 2, as shown, a variety of different parameters corresponding to pre- (intake boundary data), during (in-cylinder data), and post- (exhaust boundary data) combustion conditions are shown, according to an example embodiment. Intake boundary data 210 refers to conditions of the charge and EGR that are received by the cylinder 200. Intake boundary data 210 may include, but is not limited to, an intake manifold temperature value 211, an intake manifold pressure value 212, a humidity value 213, a charge flow value (e.g., mass flow rate of intake air) 214, an intake oxygen amount or value 215, and an EGR fraction value 216. Exhaust boundary data 230 may include, but is not limited to, an exhaust manifold temperature 231, an exhaust manifold pressure 232, an exhaust flow rate 233, and an exhaust oxygen amount 234. As shown and described herein, while the use of intake and/or exhaust boundary data 210, 230 may facilitate an engine out NOx determination, the accuracy of said engine out NOx determination tends to be low during at least one of transient and steady state engine cycles. Applicants have discovered that the use of in-cylinder data facilitates a relatively more accurate determination of engine out NOx during both steady state and transient engine cycles.

Figure 4:
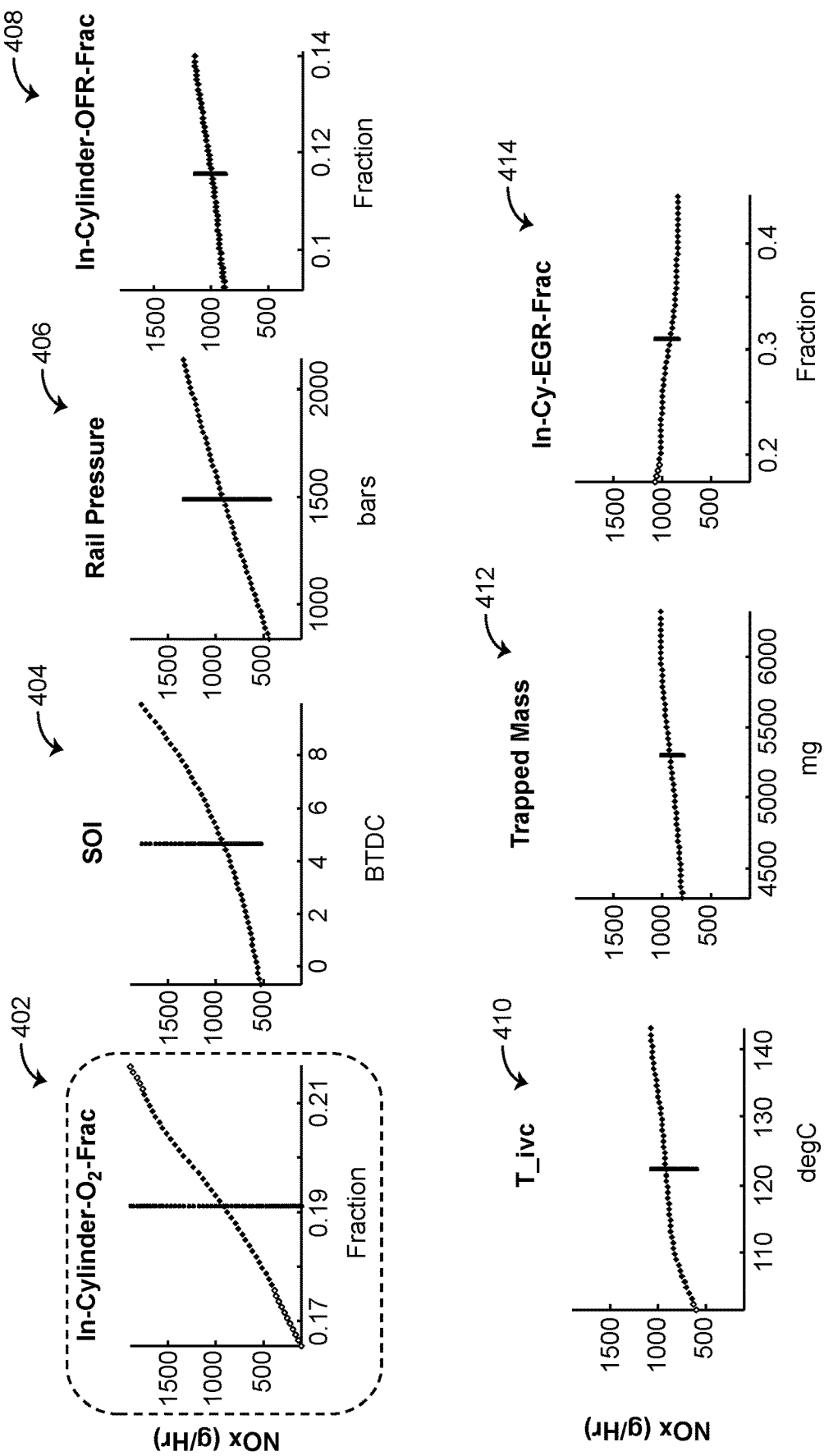
FIG. 4 are sensitivity plots illustrating the effects of particular in-cylinder data on the formation of engine out NOx, according to an example embodiment.

Accordingly, Applicants have identified several in-cylinder data points. In no particular order, the in-cylinder data or values 220 may include, but is not limited to, an engine torque 225, an engine speed 226, a start-of-injection 227, and a rail pressure 228. While these data points may provide a close approximation to the true engine out NOx amount, Applicants have found that additional in-cylinder data including a trapped air mass value 221, an in-cylinder oxygen fraction value 222, an in-cylinder EGR fraction value 223, a $T_{ivc}$ value 224, in-cylinder oxygen-to-fuel fraction 229, and in-cylinder humidity 240 have, alone and in combination, a fairly substantial effect on the engine out NOx. This effect is shown in FIG. 4. Accordingly, referring now to FIG. 4, a series of graphs based on experimental data show the effect of particular in-cylinder data on the formation of NOx, according to one embodiment. In each of graphs 402-414, the y-axis represents a NOx amount in g/Hr (grams/hour) while the x-axis represents the in-cylinder data point of interest. Graph 402 depicts NOx formation as a function of in-cylinder oxygen fraction (e.g., in-cylinder oxygen fraction data 222), according to an example embodiment. As shown, increasing the in-cylinder oxygen fraction increases the NOx formation. Graph 404 depicts NOx formation as a function of start of injection (e.g., start of injection data 227), according to an example embodiment. As shown, retarding the start-of-injection (i.e., starting injection earlier before top dead center (BTDC)) correlates with decreasing NOx formation. Graph 406 depicts NOx formation as a function of rail pressure (e.g., rail pressure 228 data), according to an example embodiment. Rail pressure refers to the fluid pressure in the rail (e.g., conduit, tube, channel, etc.) that fluidly interconnects a series of fuel injectors for an engine. As shown in graph 406, increasing rail pressure correlates with an increase in NOx formation. Graph 408 depicts NOx formation as a function of in-cylinder oxygen-to-fuel ratio (OFR), according to an example embodiment. As shown, an increase in OFR correlates with an increase in NOx formation (e.g., in-cylinder OFR 229 data). Graph 410 depicts NOx formation as a function of the temperature at intake valve closing (e.g., $T_{ivc}$ 224 data). As shown, an increase $T_{ivc}$ correlates with an increase in NOx formation. Graph 412 depicts NOx formation as a function of trapped mass (e.g., trapped air mass 221 data), according to an example embodiment. As shown, an increase in trapped air mass correlates with an increase in NOx formation. Graph 414 depicts NOx formation as a function of in-cylinder EGR fraction (e.g., in-cylinder EGR fraction 223 data), according to an example embodiment. As shown, decreasing the in-cylinder EGR fraction correlates with a decrease in NOx formation.

Based on the above, Applicants have identified that in-cylinder oxygen fraction data 222 has a substantial effect on the creation of NOx. Accordingly, as shown in regard to FIG. 5, Applicants have discovered that by utilizing this in-cylinder data point (in-cylinder oxygen fraction data 222), a relatively accurate engine out NOx determination can be achieved. Furthermore, as described below, the identification of a limited number of in-cylinder data points to be used in the engine out NOx model reduces complexity of the model which, advantageously, facilitates a reduction in computation time and an increase in efficiency of the controller.

Figure 3:
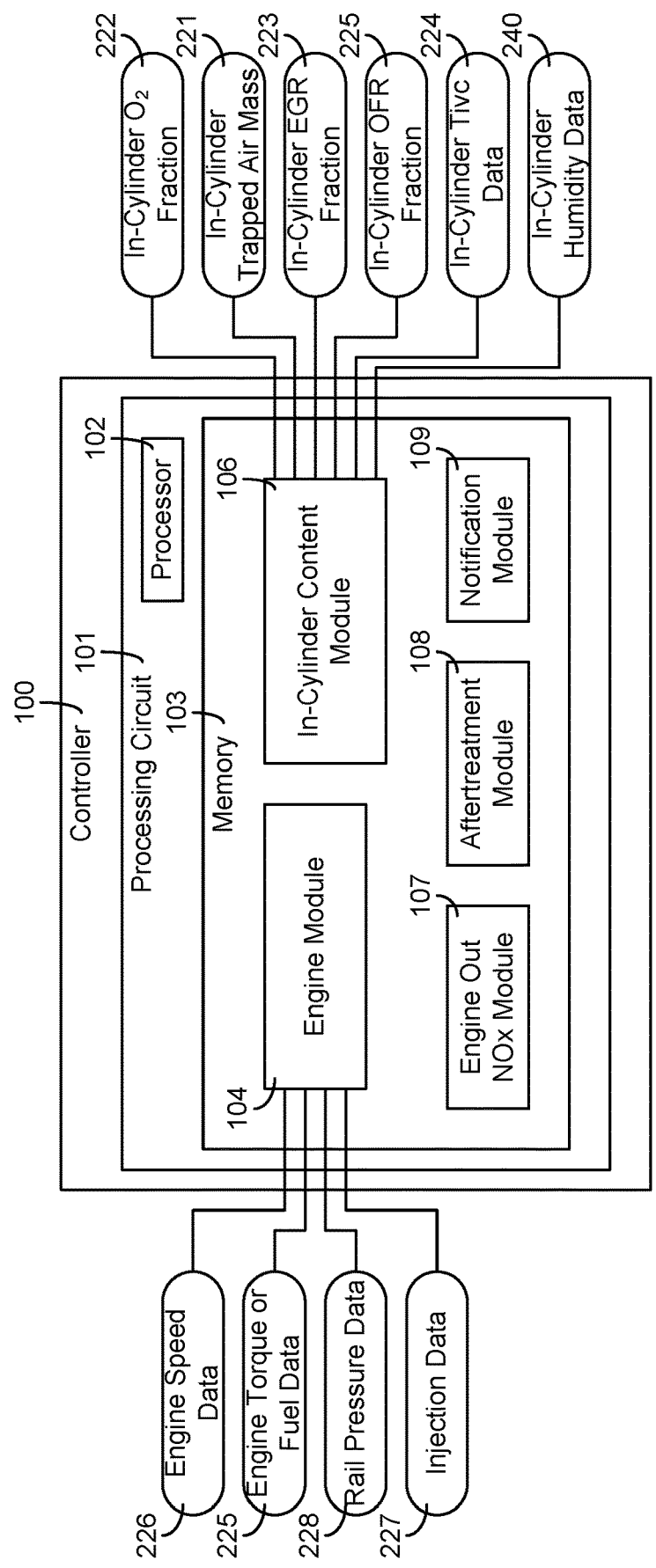
FIG. 3 is a schematic diagram of the controller used with the system of FIG. 1, according to an example embodiment.

With the above description in mind, referring now to FIG. 3, an example structure for the controller 100 is shown according to one embodiment. As shown, the controller 100 includes a processing circuit 101 including a processor 102 and a memory 103. The processor 102 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 103 (e.g., RAM, ROM, Flash Memory, hard disk storage, etc.) may store data and/or computer code for facilitating the various processes described herein. Thus, the one or more memory devices 103 may be communicably connected to the processor 102 and provide computer code or instructions to the processor 102 for executing the processes described in regard to the controller 100 herein. Moreover, the one or more memory devices 103 may be or include tangible, non-transient volatile memory or non-volatile memory. Accordingly, the one or more memory devices 103 may include database components, object code components, script components, or any other type of information structure for supporting the various activities and information structures described herein.

The memory 103 is shown to include various modules for completing at least some of the activities described herein. More particularly, the memory 103 includes modules structured to facilitate the determination of an engine out NOx amount. While various modules with particular functionality are shown in FIG. 3, it should be understood that the controller 100 and memory 103 may include any number of modules for completing the functions described herein. For example, the activities of multiple modules may be combined as a single module, additional modules with additional functionality may be included, etc. Further, it should be understood that the controller 100 may control other activity beyond the scope of the present disclosure, such as the control of other vehicle systems. In this regard, the controller 100 may be embodied as an electronic control module (ECM) included with a vehicle or included with an existing ECM, such as a transmission control unit and any other vehicle control unit (e.g., exhaust aftertreatment control unit, powertrain control module, engine control module, etc.). All such structural configurations of the controller 100 are intended to fall within spirit and scope of the present disclosure.

Certain operations of the controller 100 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the controller 100 includes an engine module 105, an in-cylinder content module 106, an engine out NOx module 107, an aftertreatment module 108, and a notification module 109. The engine module 105 may be structured to provide an engine operation command (e.g., instruction, directive, etc.) to the engine 20, wherein such engine operation command(s) may at least partly control one or more operating aspects of the engine 20. The engine operation command may include, but is not limited to, an ignition timing adjustment, an engine speed adjustment, an exhaust gas recirculation (EGR) flow amount adjustment, fuel injection timing adjustment, fuel injection pressure adjustment, a fuel injection amount adjustment, an air flow amount, a number of fuel injection pulses, a fuel flow amount, and an engine torque output, among other alternatives. The engine operation commands may be provided individually or with other commands. The extent to which any of the foregoing engine operation commands may be used and in what combination may vary based on engine design and/or engine application.

The engine module 105 is also structured to receive engine in-cylinder data. As shown in FIG. 2, the engine in-cylinder data may include, but is not limited to, engine torque or fuel data 225, engine speed data 226, injection data 227 (e.g., start of injection data), and rail pressure data 228. Engine speed data 226 refers to a speed of the engine (e.g., revolutions-per-minute). Engine torque data 225 refers to the torque output of the engine (e.g., Newton-meters, etc.). The engine torque data 225 may also be based on a fueling command as well. Injection data 227 refers to at least one of a start of injection (e.g., degrees before or after bottom dead center, etc.), an amount of fuel of injected, an order of injection for each cylinder in the engine, and the like. Rail pressure data 228 refers to the fluid pressure in a rail (e.g., tube, pipe, conduit, channel, etc.) that is fluidly coupled to one or more injectors. According to one embodiment, each piece of engine in-cylinder data may be provided by a sensor. For example, an engine speed sensor, an engine torque sensor, a start-of-injection sensor, and rail pressure sensor are included with the engine 20 and communicably coupled to the controller 100. According to another embodiment, one or more pieces of the aforementioned engine in-cylinder data may be determined (e.g., estimated, etc.) from one or more models, look-up tables, formulas, algorithms, and the like. All such variations are intended to fall within the spirit and scope of the present disclosure.

The in-cylinder content module 106 is structured to receive at least one more pieces of in-cylinder data. As described herein below and in other embodiments, the in-cylinder content module 106 is structured to determine at least one more pieces of in-cylinder data. The determination may be based on one or more formulas, algorithms, look-up tables, models and the like and use one or more engine operating parameters, such as the aforementioned engine in-cylinder data. As shown in FIG. 2, the at least one more piece of in-cylinder data includes, but is not limited to, trapped air mass data 221, in-cylinder oxygen fraction data 222, in-cylinder EGR fraction data 223, $T_{ivc}$ data 224, in-cylinder oxygen-to-fuel ratio data 229, and in-cylinder humidity data 240. As shown in FIG. 4, Applicants have discovered that in-cylinder data 221-224 and 229 may affect NOx creation.

The trapped air mass data 221 refers to an amount (e.g., mass) of air in the cylinder 200. The trapped air mass data 221 may be received by the in-cylinder content module 106 from one or more sensors and/or be determined by the in-cylinder content module 106 by one or more processes, formulas, algorithms, models, etc. An example process that may be utilized by the module 106 is as follows:

$$\text{Trapped Air Mass} = \text{Residual Mass} + \text{Charge Air Mass} \quad (4)$$

-continued $$\text{Residual Mass} = \alpha * \frac{EMP}{EMT} * \eta_{exh} \quad (5)$$

$$\alpha = 2540 \quad (6)$$

$$\eta_{exh} = 0.3 \quad (7)$$

The variable "Charge Air Mass" may be sensed via either a MAF sensor or a virtual estimator. The variables "EMP" and "EMT" refer to exhaust manifold pressure and exhaust manifold temperature, respectively. The values for each of these values may be acquired utilizing pressure and temperature sensors positioned in the exhaust manifold (see FIG. 2). The variable "a" is a constant and so is the variable "$\eta_{exh}$". These constants may be configurable/chosen based on the application, such that equations (4)-(7) show but one example determination. Many other formulas, equations, and the like may be used to determine a trapped air mass.

The in-cylinder oxygen fraction data 222 refers to the fraction of oxygen in the cylinder that is compressed for combustion. In one embodiment, the in-cylinder oxygen fraction data 222 may be acquired by a sensor and provided to the in-cylinder content module 106. In another embodiment, the in-cylinder oxygen fraction data 222 may be determined by the in-cylinder content module 106 based on one or more acquired values and/or formulas, processes, equations, etc. In another embodiment, the in-cylinder oxygen fraction may be determined via values acquired by a sensor and one or more formulas, processes, equations, etc. For example, an oxygen sensor may be placed in the intake and exhaust manifolds. Accordingly, the intake manifold oxygen sensor may supply an intake oxygen value and the exhaust manifold oxygen sensor may supply an exhaust oxygen value. Based on these two values, the in-cylinder oxygen fraction may be estimated using one or more formulas. These two different methods for calculating an in-cylinder oxygen fraction recognize that different engine systems may have different structures (e.g., where no oxygen sensors are included in the intake and exhaust manifold, the first methodology may be used). These two processes are intended for exemplary purposes only and not meant to be limiting, such that other processes, equations, formulas, sensors, models, and the like that determine or acquire data indicative of an in-cylinder oxygen fraction amount are intended to fall within the spirit and scope of the present disclosure.

The in-cylinder EGR fraction data 223 refers to the fraction of EGR provided to the cylinder 200. According to one embodiment, the in-cylinder EGR fraction data 223 is provided by a sensor (e.g., a mass flow rate sensor in the piping 206 that acquires data indicative of the EGR amount provided to the intake manifold and cylinder 200). According to another embodiment, the in-cylinder EGR fraction data 223 is determined by the in-cylinder content module 106 by one or more formulas, processes, equations, algorithms, etc. An example formula is provided in equation (8) below (in connection with the equations shown above that are used to calculate the trapped air mass data 221):

$$\text{In-Cylinder EGR Fraction} = \frac{(EGR_{mass} + \text{Residual Mass})}{\text{Total In-Cylinder Trapped Air Mass}} \quad (8)$$

Other formulas, equations, algorithms, processes, and the like may also be used to determine in-cylinder EGR fraction data 223.

The $T_{ivc}$ data 224 refers to temperature data indicative of a temperature within the cylinder at the time of the intake valve closing. According to one embodiment, a temperature sensor is positioned at, within, or near the cylinder and is structured to acquire temperature data indicative of the temperature within the cylinder at the time of the intake valve closing. According to another embodiment, a formula, algorithm, process, or the like is used to acquire the $T_{ivc}$ data 224. One such example formula for determining the $T_{ivc}$ data 224 is shown below in equation (9) (in connection with equation (8) and the equations shown above that are used to calculate the trapped air mass data 221):

$$T_{ivc} = \frac{\text{Charge Mass }(IMT) + \text{Residual Mass }(Turbo_{in}Temp)}{\text{Charge Mass} + \text{Residual Mass}} \quad (9)$$

In equation (9), "imt" refers to intake manifold temperature and "$Turbo_{in}Temp$" refers to a temperature of the fluid entering the turbocharger (or other air handling device fluidly coupled to the engine 20). In another embodiment, the Residual Mass($Turbo_{in}$Temp) may be replaced with exhaust manifold temperature data. This replacement may facilitate a relatively faster determination time due to a temperature sensor positioned within the exhaust manifold that may relatively quickly acquire the exhaust manifold temperature data. Thus, as can be seen above, other and different processes may be utilized by the in-cylinder content module 106 to determine the $T_{ivc}$ data 224.

The in-cylinder oxygen-to-fuel ratio (OFR) data 229 refers to data indicative of an oxygen-to-fuel ratio within the cylinder 200. According to one embodiment, the in-cylinder OFR data 229 may be provided by one or more sensors. According to another embodiment, the in-cylinder content module 106 is structured to determine an in-cylinder OFR. In this embodiment, the in-cylinder content module 106 may use one or more formulas, algorithms, models, look-up tables, equations, etc. For example, the in-cylinder content module 106 may use equation (10) below:

$$\text{Oxygen-to-Fuel Ratio} = \frac{\text{In-Cylinder O}_2 \text{ mass}}{\text{Total Fueling}} \quad (10)$$

The in-cylinder humidity data 240 refers to data indicative of an amount of humidity (or, in some embodiments, the relative humidity) within the cylinder 200. Thus, according to one embodiment, the in-cylinder humidity data 240 represents the humidity data 213. In this situation and as shown in FIG. 2, humidity can be sensed using a humidity sensor at the intake manifold. According to another embodiment, the in-cylinder humidity data 240 is provided via one or more sensors to the in-cylinder content module 106 (e.g., via a humidity sensor). In another embodiment, the in-cylinder content module 106 is structured to determine an amount of humidity in the cylinder. In this configuration, the in-cylinder content module 106 may use one or more formulas, algorithms, models, look-up tables, equations, etc. In each of the last two embodiments, the in-cylinder humidity data 240 may be based on data regarding one or more conditions within the cylinder (in the first embodiment, the humidity data is based on humidity data 213 that is indicative of the humidity in the intake and used to represent the humidity in the cylinder). Applicants have determined that using in-cylinder humidity data 240 affects the engine out NOx amount. To that end, humidity affects the engine out NOx amount in the following manner: humidity displaces In-Cylinder-Oxygen, which effects engine out NOx; and, humidity increases the thermal capacity of the in-cylinder-mixture just like EGR does which thereby affects combustion temperature and hence, engine out NOx.

Figure 5:
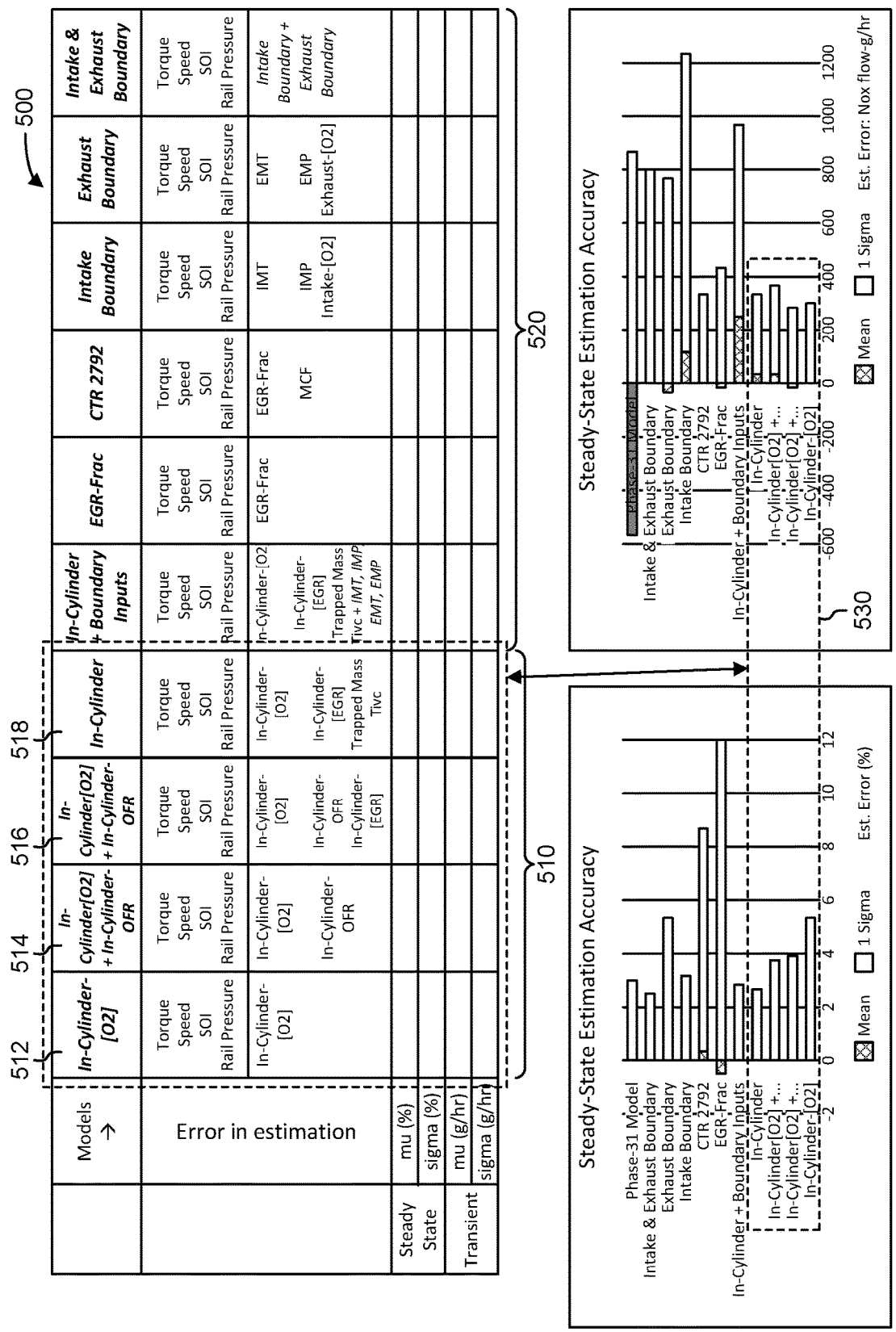
FIG. 5 is a table illustrating steady state and transient engine out NOx estimation results based on in-cylinder data relative to various other engine out NOx models, according to an example embodiment.

Responsive to the in-cylinder data, the engine out NOx module 107 is structured to determine an engine out NOx amount. While conventional systems that determine an engine out NOx utilize exhaust manifold data 230 and/or intake manifold data 220 (see FIG. 2), the engine out NOx module 107 utilizes data indicative of the contents in the cylinder. As shown in FIG. 5, the engine out NOx determination of the present disclosure that utilizes one or more in-cylinder data points facilitates relatively more accurate engine out NOx determinations in both steady state and transient engine cycles. Furthermore, by utilizing the in-cylinder data, the engine out NOx module 107 utilizes a physics-based engine out NOx determination procedure that is independent of engine architecture. Accordingly, the present disclosure is scalable and modular with respect to many different engine systems. Advantageously, this structure reduces costs while improving technical performance of the system. The engine out NOx module 107 may utilize one or more algorithms, formulas, processes, neural networks, models, look-up tables, and the like to determine the amount of engine out NOx. The selection of the engine out NOx process is highly configurable based on the application.

The aftertreatment module 108 is structured to control one or more components in an exhaust aftertreatment system, such as aftertreatment system 22. For example, the aftertreatment module 108 may control the frequency and amount of diesel exhaust fluid injected via doser 56. Accordingly, the aftertreatment module 108 may control the one or more components responsive to the engine out NOx determination by the engine out NOx module 107. The relatively more accurate engine out NOx determinations may facilitate an increased level of control by the aftertreatment module 108 (e.g., a relatively more accurate amount of diesel exhaust fluid may be injected by the doser 56). This increased level of control may prevent the risk of triggering an OBD fault code that would otherwise be caused by the doser 56 injecting inaccurate quantities of DEF into the exhaust stream.

The notification module 109 is structured to provide one or more notifications (e.g., alerts, etc.) to the input/output device 120. For example, if the determined engine out NOx is within an alert range, a notification in the form of an indicator lamp on a vehicle's dashboard may be provided to an operator. Generally, the notification module 109 may relay chosen pieces of information or data to an operator via the input/output device 120.

Figure 6:
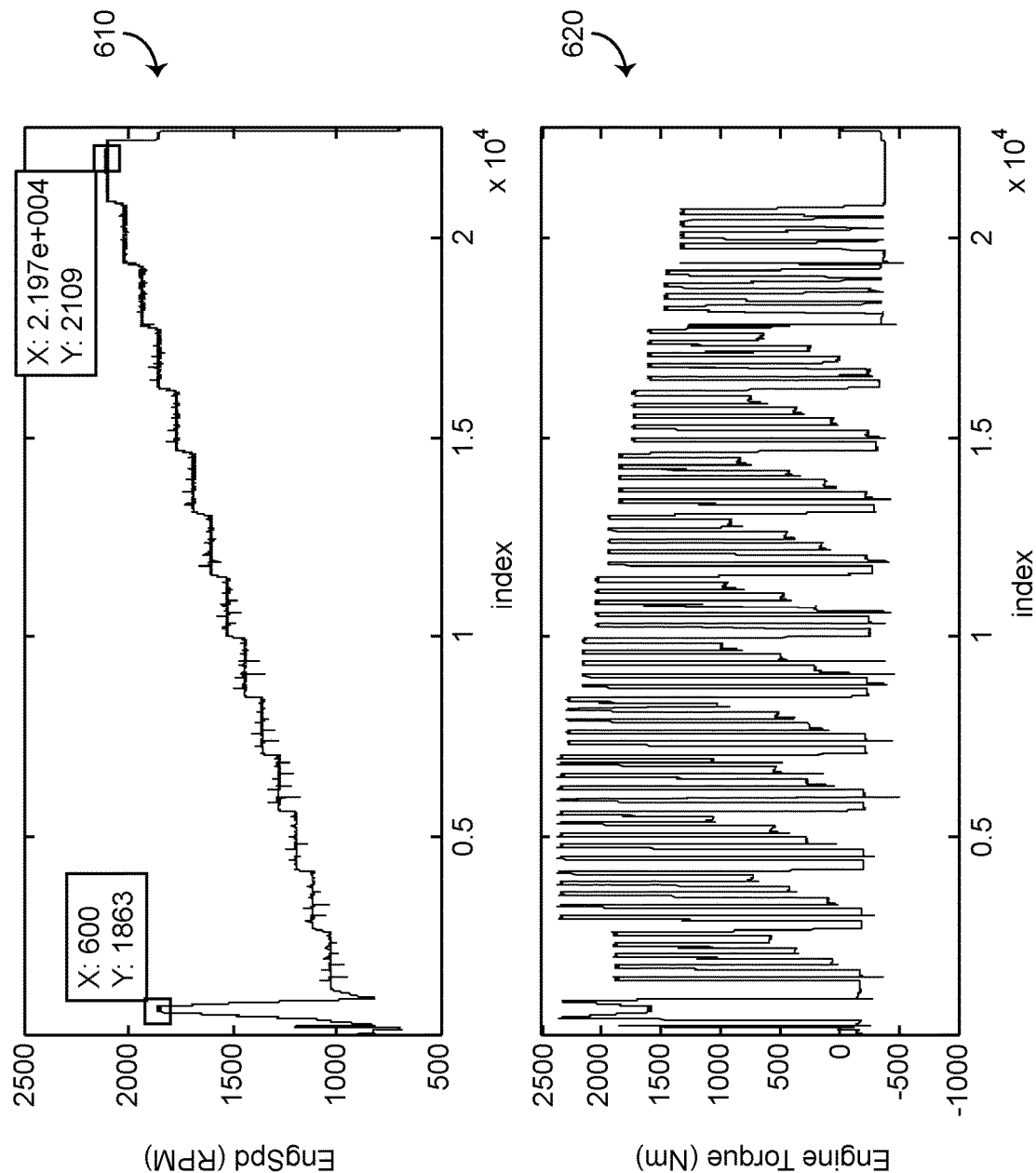
FIG. 6 are transient engine cycle graphs, according to an example embodiment.

Referring now to FIG. 5, a table illustrating steady-state and transient engine cycle engine out NOx estimation results based on in-cylinder data relative to various other engine out NOx models is shown according to an example embodiment. Each column in the table 500 represents different models used to determine an engine out NOx amount in both steady state conditions and transient engine cycle conditions. FIG. 6 depicts example transient engine cycle conditions as a function of torque (graph 620) and engine speed (graph 610). To populate table 500, Applicants have performed a series of experiments utilizing the transient conditions depicted in FIG. 6 and compiled data corresponding to those experiments.

Figure 7:
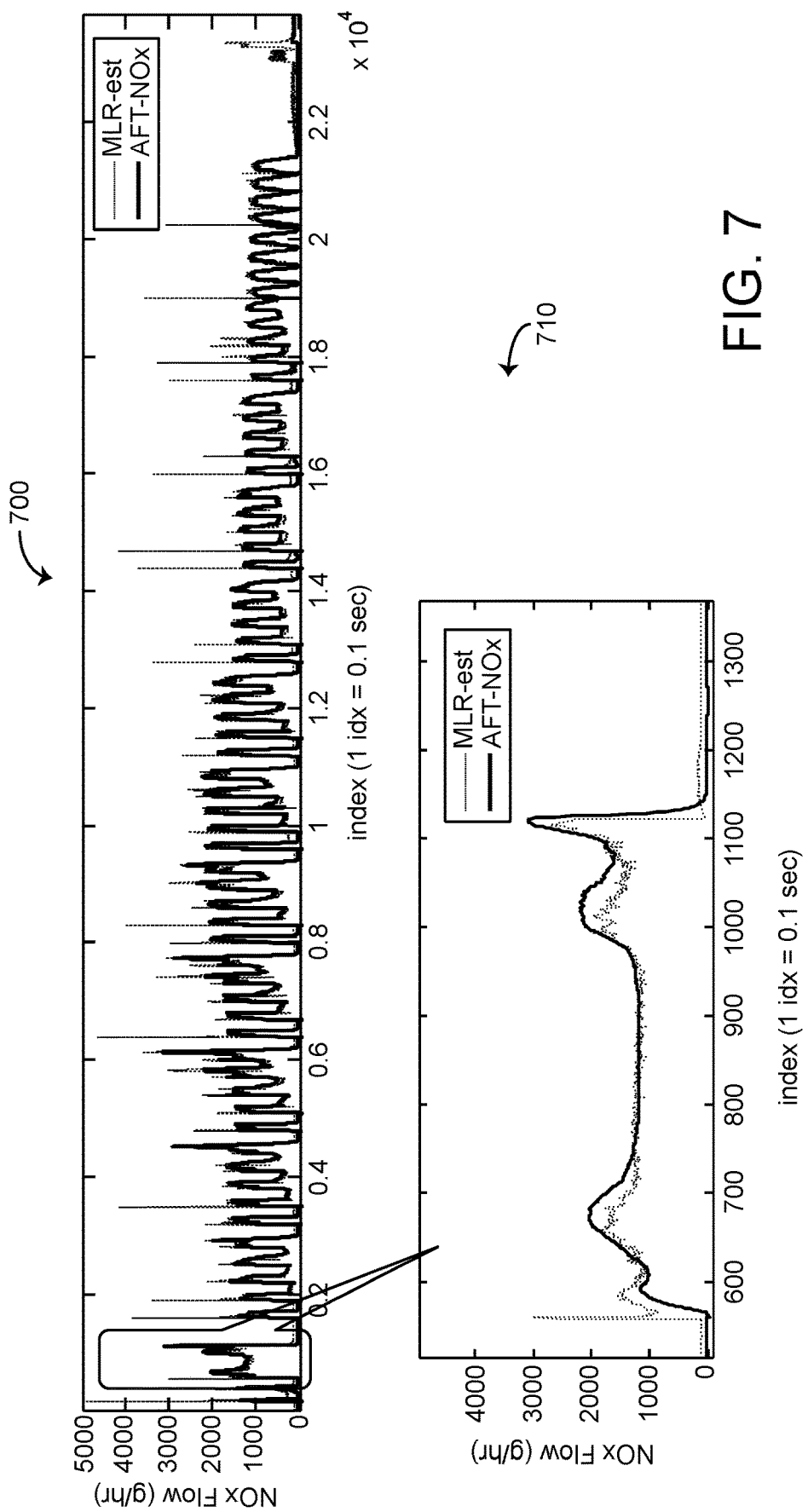
FIG. 7 is a NOx flow transient analysis graph using only in-cylinder oxygen fraction data as the in-cylinder data input for engine out NOx estimation, according to an example embodiment.
Figure 8:
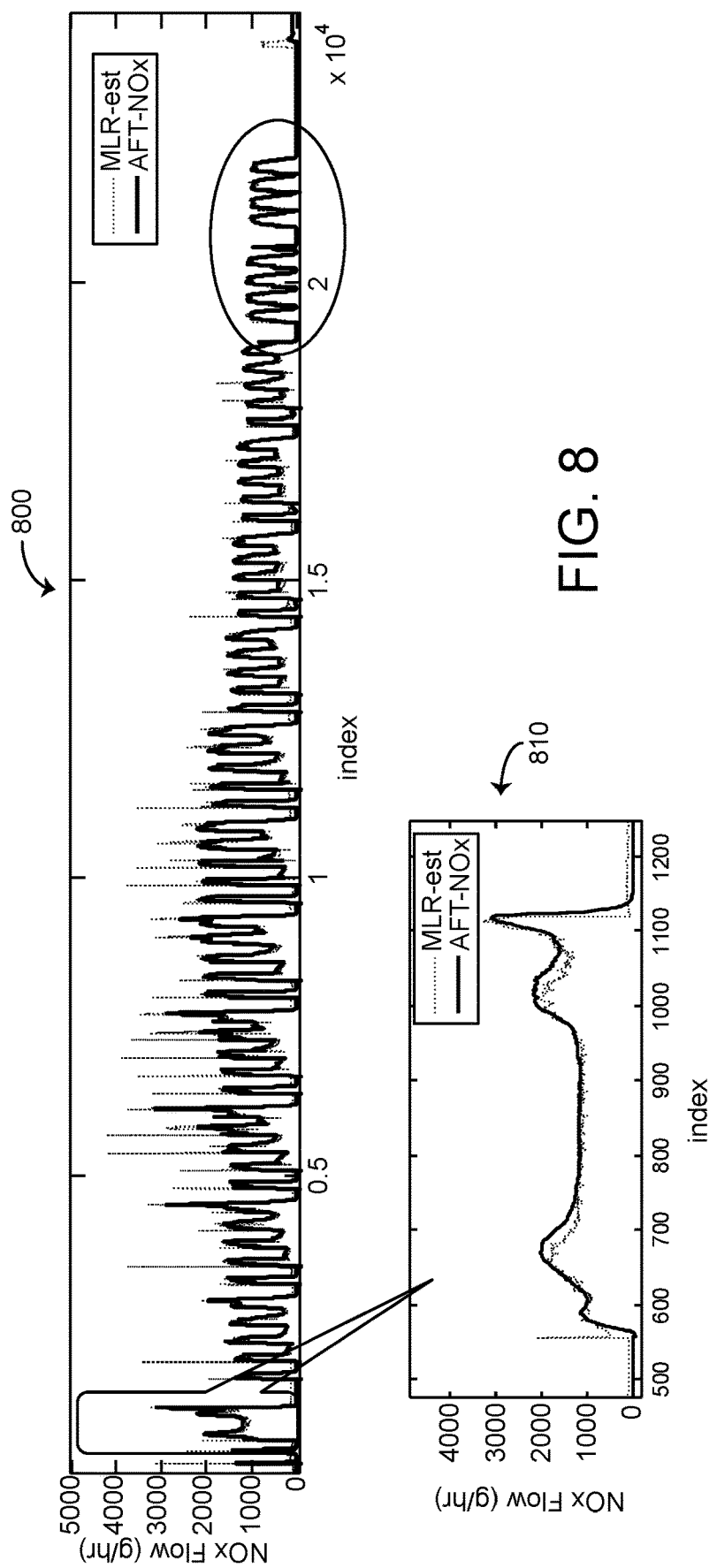
FIG. 8 is a NOx flow transient analysis graph using only in-cylinder oxygen fraction data and in-cylinder oxygen-to-fuel ratio as the in-cylinder data inputs for engine out NOx estimation, according to an example embodiment.
Figure 9:
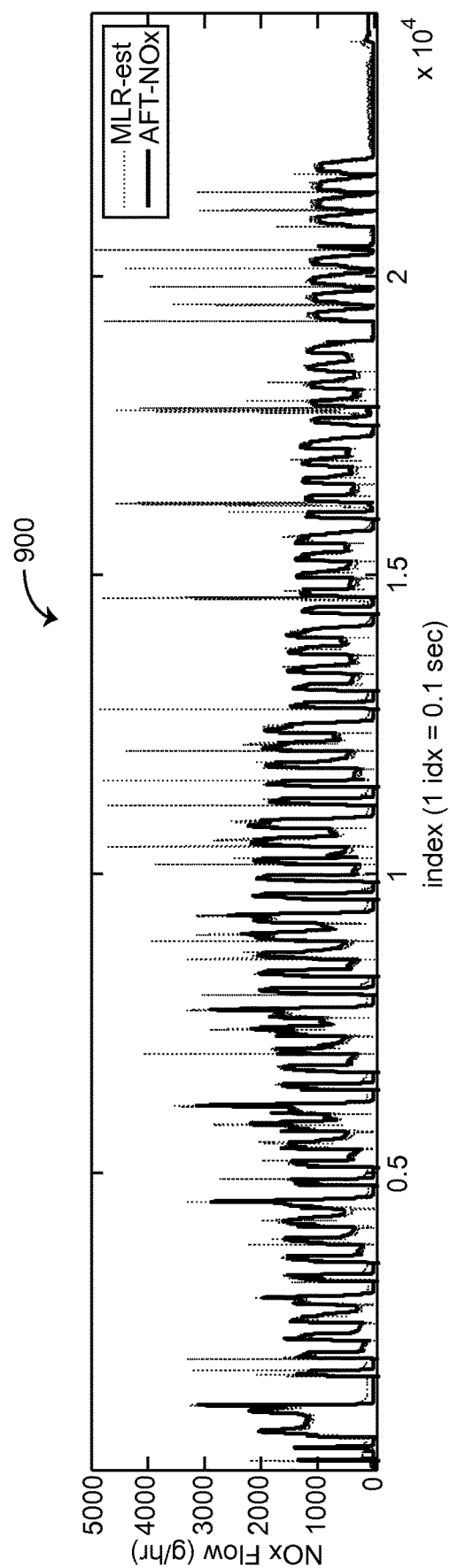
FIG. 9 is a NOx flow transient analysis graph using only in-cylinder oxygen fraction data, in-cylinder exhaust gas recirculation fraction data, and in-cylinder oxygen-to-fuel ratio data as the in-cylinder data inputs for engine out NOx estimation, according to an example embodiment.
Figure 10:
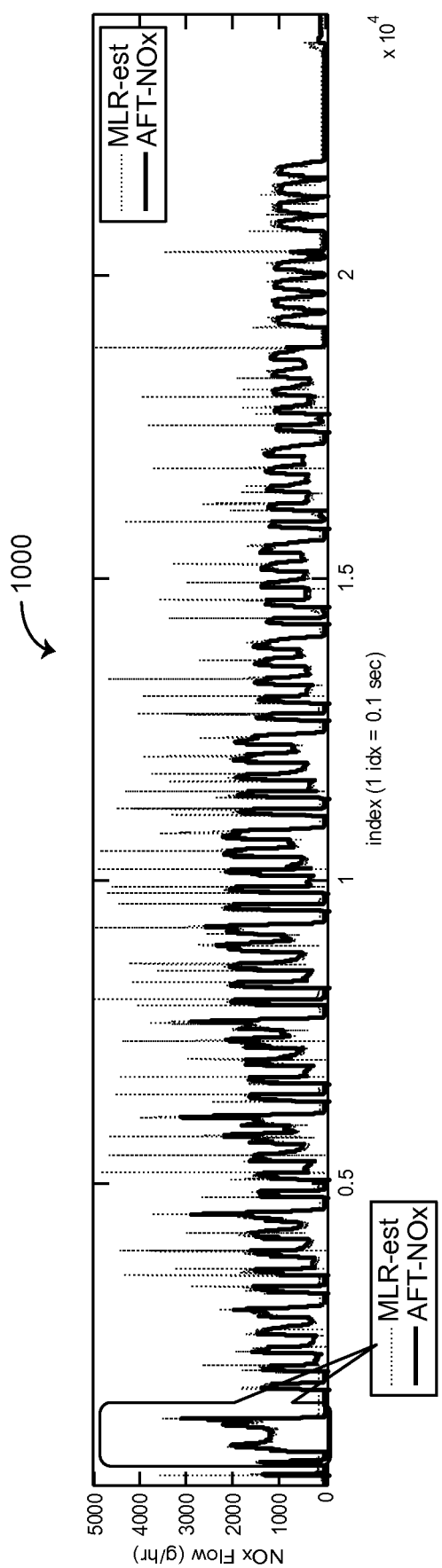
FIG. 10 is a NOx flow transient analysis graph using only in-cylinder oxygen fraction data, in-cylinder exhaust gas recirculation fraction data, in-cylinder trapped mass data, and in-cylinder oxygen-to-fuel ratio data as the in-cylinder data inputs for engine out NOx estimation, according to an example embodiment.

Columns 512, 514, 516, and 518 (collectively shown as the columns 510) depict the use of only in-cylinder content data in the model (embodied within the engine out NOx module 107) for determining an engine out NOx amount. Column 512 represents the engine out NOx module 107 using engine torque data 225, engine speed data 226, injection data 227, rail pressure data 228, and only in-cylinder oxygen fraction data 222. The experimental data behind column 512 is depicted in FIG. 7 (graphs 700 and 710). Column 514 represents the engine out NOx module 107 using engine torque data 225, engine speed data 226, injection data 227, rail pressure data 228, in-cylinder oxygen fraction data 222, and in-cylinder OFR data 229. The experimental data behind column 514 is depicted in FIG. 8 (graphs 800 and 810). Column 516 represents the engine out NOx module 107 using engine torque data 225, engine speed data 226, injection data 227, rail pressure data 228, in-cylinder oxygen fraction data 222, in-cylinder OFR data 229, and in-cylinder EGR fraction data 223. The experimental data behind column 516 is depicted in FIG. 9 (graph 900). Column 518 represents the engine out NOx module 107 using engine torque data 225, engine speed data 226, injection data 227, rail pressure data 228, in-cylinder oxygen fraction data 222, in-cylinder trapped air mass data 221, $T_{ivc}$ data 224, and in-cylinder EGR fraction data 223. The experimental data behind column 518 is depicted in FIG. 10 (graph 1000). As shown in the normalized portion—the bar graphs at the bottom of FIG. 5, relative to columns 520 that depict the use of non-in-cylinder content data (e.g., intake or exhaust manifold data) or only certain in-cylinder content data with also non-in-cylinder content data, the columns 510 have better both steady state and transient engine operating characteristics. This is readily depicted in the bar graph 530. The bar graph portion depicts the relative statistics of each of the tests performed by the Applicants.

With reference to FIGS. 7-10 and FIG. 5, it is apparent that FIGS. 7-8 (i.e., columns 512-514) correspond with the relatively most accurate engine out NOx determinations. In FIGS. 7-10, the engine out NOx amounts determined by the in-cylinder content module 106 is shown in the lighter colored (gray) graph lines while the dark (black) graph lines correspond with the true or substantially true engine out NOx amounts. This is due, at least in part, by the reduced amount of data being used in the model that could adversely cause cross-interaction between various data points. Furthermore, this relatively high accurate determination is also caused by the Applicants at least partly focusing their engine out NOx determination model on the use of in-cylinder oxygen fraction data. As mentioned above and as shown in FIG. 4, Applicants have determined and found that the in-cylinder oxygen fraction has a prominent effect on the engine out NOx determination. Accordingly, Applicants have also found that by simplifying the model to estimate the engine out NOx by focusing on in-cylinder data points that appear to have strong effects on the production of NOx, such as in-cylinder oxygen fraction, Applicants are able to reduce computation time while also increasing accuracy. Moreover, Applicants have achieved the results in table 500, columns 510, utilizing a determination process applicable to both steady state and transient engine cycles. Advantageously, this reduces memory space by avoiding the use of multiple engine out NOx determination processes for various engine operating cycles.

Figure 11:
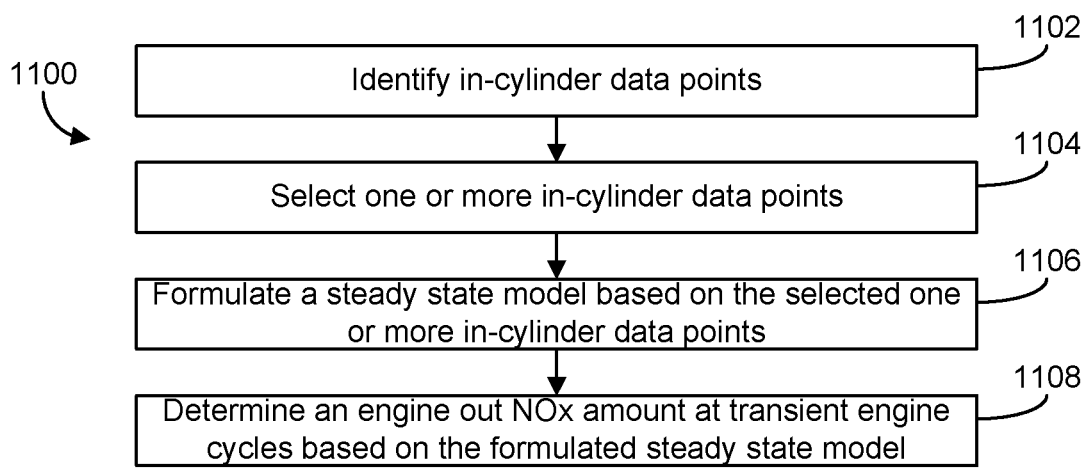
FIG. 11 is a schematic diagram of a flowchart of a method for facilitating the determination of an engine out NOx amount based on in-cylinder data, according to an example embodiment.

Referring now to FIG. 11, a flowchart of a method of identifying and selecting input variables for a model to determine engine out NOx is shown, according to one embodiment. Method 1100 represents an example analysis used by the Applicants to assemble table 500 and compare the effects of various in-cylinder data points in the engine out NOx determination process. According to one embodiment, method 1100 represents a laboratory-based method (e.g., in a test engine set up). Based on the results of method 1100, the modules in the controller 100 may be calibrated (e.g., the engine out NOx determination process reformed, the identification and selection of in-cylinder data points performed, etc.). According to another embodiment, method 1100 may be implemented in a service tool utilized by a technician. In this regard, the technician may troubleshoot one or more of the modules of the controller 100. In still another embodiment, the method 1100 may be embodied in the controller 100 such that the controller 100 may continuously experience process improvement and refinement for the determination of engine out NOx. All such variations are intended to fall within the spirit and scope of the present disclosure.

At process 1102, in-cylinder data points are identified. In-cylinder data points correspond with data indicative of one or more conditions within a cylinder of an engine. The in-cylinder data points may include, but are not limited, engine in-cylinder data points and additional in-cylinder data points. Engine in-cylinder data may include, but is not limited to, engine torque data, engine speed data, injection data (e.g., start of injection data), and rail pressure data. Additional in-cylinder data points may include, but are not limited to, trapped air mass data 221, in-cylinder oxygen fraction data 222, in-cylinder EGR fraction data 223, $T_{ivc}$ data 224, in-cylinder oxygen-to-fuel ratio data 229, and in-cylinder humidity data 240.

At processes 1104-1106, one or more of the in-cylinder data points are selected for use in the formulation of a steady state engine model. The steady state engine model is used to model operating conditions of an engine at steady state condition (e.g., limited torque or speed excursions). The steady state model is used to estimate or determine engine out NOx based on the selected in-cylinder data points. Accordingly, the steady state model may utilize one or more algorithms, processes, equations, formulas, neural networks, and the like.

At process 1108, the formulated steady state model is used to determine (e.g., estimate, etc.) engine out NOx at transient engine cycles. For example, process 1108 may include the utilization of the engine speed and torque excursions as shown in FIG. 6. During process 1108, the engine out NOx is determined. In a laboratory setting, the determined engine out NOx may be compared to a true engine out NOx amount. In this regard, the efficacy of the selected in-cylinder data points used in the steady state model may be compared to each other like that shown in table 500. Accordingly, method 1100 facilitates the identification of in-cylinder data points that may provide relatively accurate engine out NOx determinations.

It should be understood that no claim element herein is to be construed under the provisions of 35 U.S.C. § 112(f), unless the element is expressly recited using the phrase "means for."

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. In some instances, the machine-readable medium for execution by various types of processors may be implemented in the aforementioned hardware circuit. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
an engine circuit structured to interpret engine in-cylinder data regarding an operating condition within a cylinder of an engine, wherein the engine in-cylinder data includes an engine torque and an engine speed;
an in-cylinder content circuit structured to interpret at least one additional in-cylinder data point regarding the operating condition within the cylinder of the engine, the at least one additional in-cylinder data point including an in-cylinder trapped air mass amount, the in-cylinder trapped air mass amount determined based on a residual mass and a charge air mass; and
an engine out NOx circuit structured to determine an engine out NOx amount responsive to the engine in-cylinder data and the at least one additional in-cylinder data point, wherein the engine out NOx circuit is structured to determine an increasing engine out NOx amount as the in-cylinder trapped air mass amount increases and/or as a fluid pressure increases in a rail fluidly coupled to a fuel injector for the engine.

2. The apparatus of claim 1, wherein the at least one additional in-cylinder data point includes an in-cylinder oxygen fraction amount.

3. The apparatus of claim 1, wherein the at least one additional in-cylinder data point includes one or more of an in-cylinder exhaust gas recirculation amount, an in-cylinder oxygen-to-fuel ratio value, a temperature value indicative of a temperature in the cylinder at intake valve closing, and a humidity value indicative of a humidity in the cylinder.

4. The apparatus of claim 1, further comprising an aftertreatment circuit structured to control one or more components of an aftertreatment system fluidly coupled to the engine, wherein the aftertreatment circuit is structured to adjust a dosing amount responsive to the determined engine out NOx amount.

5. The apparatus of claim 1, wherein the engine includes a compression-ignition engine utilizing diesel fuel.

6. The apparatus of claim 1, further comprising a notification circuit structured to provide a notification relating to the determined engine out NOx amount to an input/output device.

7. The apparatus of claim 1, wherein use of the at least one additional in-cylinder data point facilitates a relatively accurate engine out NOx amount determination at both steady state and transient engine cycles.

8. A system, comprising:
an exhaust aftertreatment system in fluid communication with an engine; and
a controller communicably and operatively coupled to the exhaust aftertreatment system, the controller structured to:
interpret engine in-cylinder data regarding an operating condition within a cylinder of the engine, wherein the engine in-cylinder data includes an engine torque and an engine speed;
interpret at least one additional in-cylinder data point regarding the operating condition within the cylinder of the engine, the at least one additional in-cylinder data point including an in-cylinder trapped air mass amount, the in-cylinder trapped air mass amount determined based on a residual mass and a charge air mass; and
determine an engine out NOx amount responsive to the engine in-cylinder data and the at least one additional in-cylinder data point, wherein determining the engine out NOx amount includes determining an increasing engine out NOx amount as the in-cylinder trapped air mass amount increases and/or as a fluid pressure increases in a rail fluidly coupled to a fuel injector for the engine.

9. The system of claim 8, wherein the at least one additional in-cylinder data point includes an in-cylinder oxygen fraction amount.

10. The system of claim 8, wherein the at least one additional in-cylinder data point includes an in-cylinder exhaust gas recirculation amount.

11. The system of claim 8, wherein the at least one additional in-cylinder data point includes an in-cylinder oxygen-to-fuel ratio value.

12. The system of claim 8, wherein the at least one additional in-cylinder data point includes a temperature value indicative of a temperature in the cylinder at intake valve closing.

13. The system of claim 8, wherein the at least one additional in-cylinder data point includes a humidity value indicative of a humidity in the cylinder.

14. The system, of claim 8, wherein the controller is structured to control a dosing amount in the exhaust aftertreatment system responsive to the determined engine out NOx amount.

15. The system of claim 8, wherein the controller is structured to provide a notification relating to the determined engine out NOx amount to an input/output device.

16. The system of claim 8, wherein use of the at least one additional in-cylinder data point facilitates a relatively accurate engine out NOx amount determination at both steady state and transient engine cycles.

17. A method, comprising:
identifying, by a controller, an in-cylinder data point indicative of one or more conditions within a cylinder of an engine;
selecting, by the controller, one or more of the in-cylinder data points, the one or more in-cylinder data points including an in-cylinder trapped air mass amount, the in-cylinder trapped air mass amount determined based on a residual mass and a charge air mass;
responsive to selecting the one or more in-cylinder data points, formulating, by the controller, a steady state approximation indicative of operating conditions of the engine in a steady state condition; and
determining, by the controller, an engine out NOx amount at a transient engine cycle based on the steady state approximation.

18. The method of claim 17, wherein the in-cylinder data point includes an oxygen fraction amount.

19. The method of claim 17, further comprising adjusting, by the controller, a dosing amount in an exhaust aftertreatment system fluidly coupled to the engine responsive to the determined engine out NOx amount.

20. A non-transitory computer-readable medium having instructions stored therein that, when executed by a controller comprising one or more processors, cause the controller to perform functions comprising:

interpreting engine in-cylinder data regarding an operating condition within a cylinder of an engine, the engine in-cylinder data including an engine torque and an engine speed;

interpreting at least one additional in-cylinder data point regarding the operating condition within the cylinder of the engine, the at least one additional in-cylinder data point including an in-cylinder trapped air mass amount, the in-cylinder trapped air mass amount determined based on a residual mass and a charge air mass; and determining an engine out NOx amount responsive to the engine in-cylinder data and the at least one additional in-cylinder data point, wherein determining the engine out NOx amount includes determining an increasing engine out NOx amount as the in-cylinder trapped air mass amount increases and/or as a fluid pressure increases in a rail fluidly coupled to a fuel injector for the engine.

21. The non-transitory computer-readable medium of claim 20, wherein the instructions further cause functions comprising controlling one or more components of an aftertreatment system fluidly coupled to the engine.

22. The non-transitory computer-readable medium of claim 21, wherein the controlling the one or more components of the aftertreatment system includes adjusting a dosing amount responsive to the determined engine out NOx amount.

23. The non-transitory computer-readable medium of claim 20, wherein the at least one additional in-cylinder data point includes an in-cylinder oxygen fraction amount.

24. The non-transitory computer-readable medium of claim 20, wherein the at least one additional in-cylinder data point includes one or more of an in-cylinder exhaust gas recirculation amount, an in-cylinder oxygen-to-fuel ratio value, a temperature value indicative of a temperature in the cylinder at intake valve closing, and a humidity value indicative of a humidity in the cylinder.

* * * * *